UNITED STATES PATENT OFFICE 2,419,080

METHOD OF COATING WITH ALKALI SILICATE

Charles E. Kraus, Sparks, Md.

No Drawing. Application July 28, 1942,
Serial No. 452,605

3 Claims. (Cl. 117—46)

This invention relates to an impervious coating composition, and process of making the composition which is especially adaptable for use on surfaces such as concrete, Portland cement, gypsum, earthenware, asbestos-cement products, ferrous metals and the like.

The coating composition, when cured, forms a firm, hard coating which is highly tenacious, which will not peel or chip off or develop cracks in use, which is insoluble in water, and which is capable of withstanding the effects of weather.

The coating composition may be of a somewhat viscous or pasty consistency, and may be applied by spraying, brushing, dipping or in other manners. After application the coating composition is preferably cured or set by heat.

The coating composition may be made up completely and stored indefinitely in containers.

A mixture of a water soluble silicate, clay and water, when applied as a coating, tends to blister when cured by heat, due to the fact that a skin forms quickly when subjected to air. The skin tends to lift when the water is forced out by heat.

In the preparation of the composition of this invention an organic substance, preferably in liquid form is used, and lignin is preferred. It may be prepared by boiling lignite, after wet grinding, in either a caustic or acid solution, or lignitic clays or clays containing lignite may be treated in the same way, or lignin may be obtained from any woody material, such as sawdust, peat, corn stalks or most any plant or vegetable fibers.

The lignin solution is then mixed with a water soluble silicate such as sodium, ammonium or potassium silicate, an inert filler, such as clay, shale or infusorial earth and water.

Should the lignin be prepared in an acid solution, it should be alkalized before using it with the water soluble silicate to prevent the coagulation of the silicate.

After the application of the composition to the article to be coated, it is preferably cured or set by heat, preferably within the operating temperature range of 250°–750° F.

The lignin solution permits the water to leave the film after the coating is applied, without peeling, blistering or cracking, the lignin being intimately mixed, and on heating, partly volatilizes and partly carbonizes, making a medium through which the water escapes by puncturing the film. The downward shrinkage of the film as the water is driven off, closes the microscopic holes, resulting in an imperforate coating.

In the place of clay or perhaps used with it, metallic oxides such as iron oxide, chrome oxide, titanium oxide, and the like, may be used as pigments. Where lignitic clays are initially used, it may not be necessary to add other clay for a body or filler.

An example of suitable proportions is as follows:

By weight, 500 parts of lignite are ground in 800 parts of water and then boiled with 20 parts of caustic soda until the lignin is released or liberated (suspended in) in the solution. To 100 parts of this lignin solution may be added 580 parts of silicate of soda, 180 parts of clay and 180 parts of water to produce the liquid coating, ready for use or storage.

These proportions may be varied, as well as certain of the materials, to obtain results suitable for coating imperviously concrete, Portland cement, gypsum, earthenware, asbestos-cement, ferrous metals and many other products.

What is claimed as new and is desired to be secured by Letters Patent is:

1. The method of coating an article comprising boiling vegetable fibers in an aqueous solution to release the lignin from the fibers and adding a water soluble silicate selected from the group consisting of sodium, potassium and ammonium and an inert filler and mixing the ingredients in the presence of water, the lignin being present in small proportion in relation to the silicate, and applying the composition to an article to be coated and drying the coating with a temperature ranging from 250° to 750° F., the lignin drying and forming pores in the fluid coating for the escape of the moisture, the pores formed by the lignin being closed upon the escape of the moisture, forming an impervious coating.

2. The method of coating an article comprising boiling vegetable fibers in an aqueous solution to release the lignin from the fibers and adding a water soluble silicate selected from the group consisting of sodium, potassium and ammonium and an inert filler, the lignin being present in small proportion in relation to the silicate to permeate the composition and mixing the ingredients in the presence of water and applying the composition to an article to be coated and drying the coating with a temperature ranging from 250° to 750° F. the lignin drying and forming pores in the fluid coating for the escape of the moisture from the composition.

3. The method of coating an article comprising mixing in the presence of water lignin, a water soluble silicate selected from the group consisting of sodium, potassium and ammonium and an inert filler, the lignin being present in small proportion in relation to the silica, and applying the composition to an article to be coated and drying the coating with a temperature ranging from 250° to 750°, the lignin drying and forming pores in the fluid coating for the escape of the moisture, the pores formed by the lignin being closed upon the escape of the moisture.

CHARLES E. KRAUS.

REFERENCES CITED

The following references are of record in the file of this patent:

UNITED STATES PATENTS

| Number | Name | Date |
| --- | --- | --- |
| 1,311,215 | Ellis | July 29, 1919 |
| 1,848,981 | Wallace | Mar. 8, 1932 |
| 1,013,137 | Diamand | Jan. 2, 1912 |
| 1,854,701 | Laucks et al. | Apr. 19, 1932 |
| 2,261,260 | Kraus | Nov. 4, 1941 |